(12) United States Patent
Fukuyama et al.

(10) Patent No.: US 7,324,729 B2
(45) Date of Patent: Jan. 29, 2008

(54) OPTICAL DEVICE

(75) Inventors: Masashi Fukuyama, Inuyama (JP);
Yasunori Iwasaki, Nagoya (JP);
Akiyoshi Ide, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/288,936

(22) Filed: Nov. 29, 2005

(65) Prior Publication Data

US 2006/0098912 A1    May 11, 2006

Related U.S. Application Data

(63) Continuation of application No. PCT/JP04/07628, filed on Jun. 2, 2004.

(30) Foreign Application Priority Data

Jun. 2, 2003   (JP) ............................. 2003-157201
Jul. 11, 2003  (JP) ............................. 2003-273514

(51) Int. Cl.
*G02B 6/26* (2006.01)
*G02B 6/42* (2006.01)

(52) U.S. Cl. ............................. 385/48; 385/91; 385/15; 385/31; 385/36; 385/37; 385/44; 385/47; 385/88; 385/90

(58) Field of Classification Search .................. 385/48
See application file for complete search history.

(56) References Cited

U.S. PATENT DOCUMENTS

| | | |
|---|---|---|
| 4,165,496 A | 8/1979 | Di Domenico, Jr. et al. |
| 4,756,590 A | 7/1988 | Forrest et al. |
| 4,989,338 A | 2/1991 | Tsuji et al. |
| 5,150,438 A | 9/1992 | Brown |
| 5,452,387 A | 9/1995 | Chun et al. |
| 5,497,438 A | 3/1996 | Ishikawa et al. |
| 5,499,309 A | 3/1996 | Kozuka et al. |
| 5,535,296 A | 7/1996 | Uchida |

(Continued)

FOREIGN PATENT DOCUMENTS

EP    0 840 150 A2    5/1998

(Continued)

OTHER PUBLICATIONS

U.S. Appl. No. 11/156,315, filed Jun. 17, 2005, Fukuyama et al.

(Continued)

*Primary Examiner*—Frank G. Font
*Assistant Examiner*—Mary El-Shammaa
(74) *Attorney, Agent, or Firm*—Burr & Brown

(57) ABSTRACT

An optical device is made up of a glass substrate, an optical fiber array fixed to an upper portion of the glass substrate, a slit that extends from an upper surface of the optical fiber array into the glass substrate, a filter member inserted into the slit, and a resin filled in an interval between the slit and the filter member. An upper end of a light-incident surface of the filter member is positioned substantially in alignment with upper surfaces of the optical fibers, and an upper end of a light-exiting surface of the filter member is disposed at a position below the upper surfaces of the optical fibers.

5 Claims, 10 Drawing Sheets

U.S. PATENT DOCUMENTS

| | | |
|---|---|---|
| 5,771,322 A | 6/1998 | Matsumoto et al. |
| 5,793,106 A | 8/1998 | Yasukawa et al. |
| 5,930,423 A | 7/1999 | Chen et al. |
| 6,027,253 A | 2/2000 | Ota et al. |
| 6,075,911 A | 6/2000 | Goto |
| 6,118,915 A * | 9/2000 | Sato .......................... 385/39 |
| 6,250,820 B1 | 6/2001 | Melchior et al. |
| 6,282,352 B1 | 8/2001 | Kato et al. |
| 6,304,708 B1 | 10/2001 | Fukuyama et al. |
| 6,327,407 B1 | 12/2001 | Mitsuda et al. |
| 6,344,248 B1 | 2/2002 | Suga |
| 6,406,196 B1 | 6/2002 | Uno et al. |
| 6,476,379 B2 | 11/2002 | Ando et al. |
| 6,626,584 B2 | 9/2003 | Fujita et al. |
| 6,784,764 B2 | 8/2004 | Kadota et al. |
| 6,793,410 B2 | 9/2004 | Nakanishi et al. |
| 6,803,639 B2 | 10/2004 | Ono et al. |
| 6,819,840 B2 * | 11/2004 | Tohgoh et al. ................ 385/49 |
| 2001/0024553 A1 | 9/2001 | Nakanishi et al. |
| 2003/0044119 A1 | 3/2003 | Sasaki et al. |
| 2003/0095756 A1 | 5/2003 | Tohgoh et al. |
| 2004/0042728 A1 | 3/2004 | Ito et al. |
| 2004/0086231 A1 | 5/2004 | Fukuyama et al. |

FOREIGN PATENT DOCUMENTS

| | | |
|---|---|---|
| EP | 0 844 503 A1 | 5/1998 |
| EP | 0 908 746 | 4/1999 |
| EP | 0 943 941 A1 | 9/1999 |
| EP | 0 994 171 A2 | 4/2000 |
| EP | 1 063 542 A1 | 12/2000 |
| EP | 1 312 960 A1 | 5/2003 |
| FR | 2 549 243 | 1/1985 |
| JP | 62-056908 | 3/1987 |
| JP | 63-191111 A | 8/1988 |
| JP | 63-205611 | 8/1988 |
| JP | 63-249118 | 10/1988 |
| JP | 64-023206 | 1/1989 |
| JP | 64-42610 A | 2/1989 |
| JP | 2-15203 A | 1/1990 |
| JP | 2-96609 | 4/1990 |
| JP | 02-113708 | 4/1990 |
| JP | 3-103804 A | 4/1991 |
| JP | 03-271706 | 12/1991 |
| JP | 04-152306 | 5/1992 |
| JP | 04-308804 | 10/1992 |
| JP | 05-203830 A1 | 8/1993 |
| JP | 06-075137 | 3/1994 |
| JP | 6-103821 A1 | 4/1994 |
| JP | 06-331837 | 12/1994 |
| JP | 7-104146 A | 4/1995 |
| JP | 07-104148 | 4/1995 |
| JP | 7-159658 A | 6/1995 |
| JP | 07-234345 | 9/1995 |
| JP | 07-294742 A1 | 11/1995 |
| JP | 08-179128 A1 | 7/1996 |
| JP | 08-179171 | 7/1996 |
| JP | 8-213427 | 8/1996 |
| JP | 09-021912 A1 | 1/1997 |
| JP | 09-033729 A1 | 2/1997 |
| JP | WO97/06458 | 2/1997 |
| JP | 09-061664 A1 | 3/1997 |
| JP | 09-101435 | 4/1997 |
| JP | 09-105824 A1 | 4/1997 |
| JP | 9-120014 | 5/1997 |
| JP | 09-186348 A1 | 7/1997 |
| JP | 10-062660 | 3/1998 |
| JP | 10-133054 | 5/1998 |
| JP | 10-186182 A1 | 7/1998 |
| JP | 10-227953 | 8/1998 |
| JP | 10-293219 A1 | 11/1998 |
| JP | 10-300936 A1 | 11/1998 |
| JP | 10-307221 A1 | 11/1998 |
| JP | 10-325917 | 12/1998 |
| JP | 11-133255 A1 | 5/1999 |
| JP | 11-142690 A1 | 5/1999 |
| JP | 11-248954 | 9/1999 |
| JP | 2000-009953 | 1/2000 |
| JP | 2000-249874 A1 | 9/2000 |
| JP | 2000-347050 A1 | 12/2000 |
| JP | 2001-100063 A1 | 4/2001 |
| JP | 2001-264594 A1 | 9/2001 |
| JP | 2002-182051 A | 6/2002 |
| JP | 2002-343983 A1 | 11/2002 |
| JP | 2003-107301 A1 | 4/2003 |
| JP | 2003-156665 A1 | 5/2003 |
| JP | 2003-294992 A1 | 10/2003 |
| JP | 2001-513216 | 8/2004 |
| WO | WO 02/31547 A2 | 4/2002 |

OTHER PUBLICATIONS

U.S. Appl. No. 11/156,324, filed Jun. 17, 2005, Fukuyama et al.
U.S. Appl. No. 11/156,298, filed Jun. 17, 2005, Fukuyama et al.
K. Motoki et al., "Connecting Technology of Anisotropic Conductive Materials," Fujikura Giho, No. 99, Oct. 2000, pp. 32-38 (with partial translation of pertinent portion thereof).

* cited by examiner

Appendix A

Appendix A

OPTICAL DEVICE

BACKGROUND OF THE INVENTION

1. Field of the Invention

The present invention relates to an optical device having a single optical fiber or a plurality of optical fibers (optical fiber array), or a single optical waveguide or a plurality of optical waveguides, and more particularly to an optical device suitable for monitoring signal light while it is propagated through such an optical transmitting means.

2. Description of the Related Art

When using present optical communication technology, it is important to monitor the communication quality. In particular, monitoring optical output plays an important role in the field of wavelength multiplex communication technology.

In recent years, there have been growing demands for smaller size, higher performance, and lower costs in optical output monitoring technology.

Heretofore, certain technology, for example, as disclosed in Japanese Laid-Open Patent Publication No. 2001-264594, has been proposed. According to such proposed technology, an optical waveguide core is disposed in a substrate, and then a slit is formed in the substrate obliquely across the core (the optical axis thereof). A light reflecting base (filter member) is inserted into the slit.

Of signal light propagated through the optical fiber, a light component (reflected light) reflected by the light reflecting base is extracted out of the optical waveguide. The reflected light is detected by a photodetector, for example, to monitor the signal light.

According to the conventional arrangement, as shown in FIGS. 9 and 10, when a filter member 206 is inserted in a slit 204 extending across a core 202 of an optical waveguide 200, an upper portion (hereinafter referred to as an upper portion of the filter member 206), including an upper end 208a of a face surface (light-incident surface 208) of the filter member 206, and an upper end 210a of a reverse surface (light-exiting surface 210) thereof project from the upper surface of the optical waveguide 200. This arrangement allows the filter member 206 to be handled with ease when the filter member 206 is inserted into the slit 204, because the slit 204 generally has a depth of several hundred μm.

However, since the upper portion of the filter member 206 projects from the upper surface of the optical waveguide 200, the following problems tend to arise:

(1) The gap between the slit 204 and the filter member 206 is filled with a resin 212. If the resin 212 poses a large stress (i.e., if it is a hard resin), then the stress is applied to the projecting portion of the filter member 206, tending to break the projecting portion of the filter member 206. This is liable to cause a reliability problem.

(2) The above problem (1) manifests itself if the slit 204 is formed obliquely within the optical waveguide 200, as shown in FIG. 10. Particularly, the portion of the filter member 206 that forms an acute angle with respect to the upper surface of the optical waveguide 200, i.e., the portion of the light-exiting surface 210 of the filter member 206 that projects from the upper surface of the optical waveguide 200, is subject to stress concentration and tends to be broken.

(3) If the gap between the slit 204 and the filter member 206 is filled with a resin 212 of low viscosity, then when the filter member 206 is inserted into the slit 204 with the upper portion thereof projecting, the filter member 206 itself serves as a guide, which allows the resin 212 to creep onto the upper surface of the optical waveguide 200, as shown in FIGS. 9 and 10. In this case, the refractive index of the resin 212 changes the effective refractive index of the optical waveguide 200, thereby affecting the propagation characteristics of the signal light.

(4) When the resin 212, which has crept onto the upper surface of the optical waveguide 200, is subsequently expanded or contracted, it applies stresses to the projecting portion of the filter member 206, tending to break the filter member 206.

(5) If a photodetector is mounted on the optical waveguide 200, then when the resin 212 that has crept onto the upper surface of the optical waveguide 200 enters the optical path of divided light, the light detecting characteristics of the photodetector with respect to the divided light become degraded, and the detecting accuracy thereof is lowered. This problem can be ignored if an optical fiber is used instead of the optical waveguide 200. However, if an adhesive made of a material different from the resin 212 is used to install the photodetector, then since a boundary occurs, which causes a refractive index change, the above problem cannot be ignored.

(6) If a photodetector is mounted on the optical waveguide 200, as described above in (5), then the upper portion of the filter member 206, which projects from the upper surface of the optical waveguide 200, tends to present an obstacle to proper mounting of the photodetector.

SUMMARY OF THE INVENTION

It is an object of the present invention to provide an optical device which is effective to prevent a dividing member from becoming broken, which prevents resin from creeping onto a light transmitting means, and which also prevents the effective refractive index of the light transmitting means from changing unnecessarily. When an optical unit is mounted on the light transmitting means, the dividing member does not present an obstacle to proper mounting of the optical unit, whereby the optical device is capable of improving reliability while also increasing the capability for monitoring signal light.

An optical device according to the present invention has a light transmitting means, a slit extending from an upper portion of the light transmitting means to at least a core of the light transmitting means, a dividing member inserted in the slit for dividing a portion of signal light propagated through the core, and a resin filled in a gap between the slit and the dividing member in the slit, wherein of a light-incident surface and a light-exiting surface of the dividing member, at least the light-exiting surface has an upper end positioned below the upper portion of the light transmitting means.

Specifically, the dividing member is embedded in its entirety in the slit or has a portion facing the light-incident surface and projecting from the upper portion of the light transmitting means. Therefore, even if the resin filled in the gap between the slit and the dividing member imposes large stress, the dividing member is prevented from being broken.

If an inner wall surface of the slit facing the light-incident surface of the dividing member has an angle of 5° or greater with respect to a plane perpendicular to the optical axis of the core, i.e., if the slit is defined obliquely to the light transmitting means, then the upper end of the light-exiting surface of the dividing member is embedded in the slit, and therefore concentration of stress does not occur on the dividing member.

If the upper end of the light-exiting surface of the dividing member is embedded in the slit, the resin in the slit does not creep onto the upper surface of the light transmitting means. Therefore, when an optical unit is disposed upwardly of the light transmitting means for monitoring signal light propagated through the light transmitting means based on the divided light, then only a refractive index matching layer, for example, is interposed between the light transmitting means and the optical unit. Consequently, even if the material of the refractive index matching layer filled between the light transmitting means and the optical unit or the material of the resin filled in the slit is changed, the number of refractive index interfaces is not increased, and the PDL (Polarization Dependent Loss) is prevented from increasing. This leads to a greater choice of materials for the refractive index matching layer filled between the light transmitting means and the optical unit or the resin filled in the slit.

The resin in the slit creeps onto the upper surface of the light transmitting means if the portion of the dividing member, which faces the light-incident surface, projects from the upper portion of the light transmitting means. However, the amount at which the resin creeps is too small to affect the effective refractive index of the light transmitting means.

With the above arrangement, the optical unit for detecting light divided by the dividing member may be disposed on the upper portion of the light transmitting means. In this case, since almost no resin creeps onto the upper surface of the light transmitting means, the light detecting characteristics are prevented from becoming degraded by the resin. Furthermore, when the optical unit is mounted on the light transmitting means, the dividing member does not present an obstacle to proper mounting of the optical unit.

An inner wall surface of the slit facing the light-incident surface of the dividing member may have a first surface covering the core and a second surface extending to a bottom of the slit. In addition, if the shortest distance from the boundary between the first surface and the second surface to the dividing member is indicated by d1, and the shortest distance from the upper end of the light-incident surface of the dividing member to the first surface of the slit is indicated by d2, then the shortest distances may be related to each other by d1<d2.

The above arrangement is effective to reduce interference between the light divided by the inner wall surface of the slit and the light divided by the dividing member, thereby increasing the capability for monitoring the signal light and also improving reliability.

With the above arrangement, however, a large space (a resin reservoir) is created between the dividing member and the slit, and the core is exposed in such a space. Therefore, if the upper portion of the dividing member projects from the upper surface of the light transmitting means (the upper portion including the upper end of the light-incident surface and the upper end of the light-exiting surface of the dividing member), as is the case with the conventional structure, then when the dividing member becomes broken due to external forces or due to stress concentration upon expansion and contraction of the resin, broken pieces drop into and are accumulated inside the resin reservoir, tending to seriously degrade the propagation characteristics of the signal light that passes through the core. Furthermore, if the dividing member is made of a soft material, such as polyimide or the like, and the upper portion of the dividing member projects, then the angle at which the dividing member is inserted also changes upon expansion and contraction of the resin, tending to degrade the characteristics with which the signal light is monitored.

According to the present invention, since the upper end of at least the light exiting surface of the dividing member is positioned below the upper portion of the light transmitting means, even if the dividing member projects from the upper surface of the light transmitting means, the distance by which the dividing member projects is small. Therefore, the dividing member is subject to almost no external forces, and cannot be broken. Even if the dividing member is made of a soft material, the angle at which the dividing member is inserted is not changed upon expansion and contraction of the resin, and hence the characteristics for monitoring signal light are not degraded upon expansion and contraction of the resin.

Thus, the optical device according to the present invention employs a secure structure that is effective to reduce interference of the divided light, thereby increasing signal light monitoring functions, and also improving reliability.

In the above arrangement, the difference between an angle formed between the first surface and a plane perpendicular to the optical axis of the core, and an angle formed between the second surface and the plane perpendicular to the optical axis of the core, should preferably be 0.5° or greater. If the difference is smaller than 0.5°, then light divided by the dividing member interferes with reflected light produced due to the refractive index difference between the resin on the inner wall surface of the slit and the optical fiber, tending to degrade the ability to monitor signal light.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Embodiments in which an optical device according to the present invention is applied to a 4-channel inline power monitor module, for example, will be described below with reference to FIGS. 1 through 8.

Figure 1:
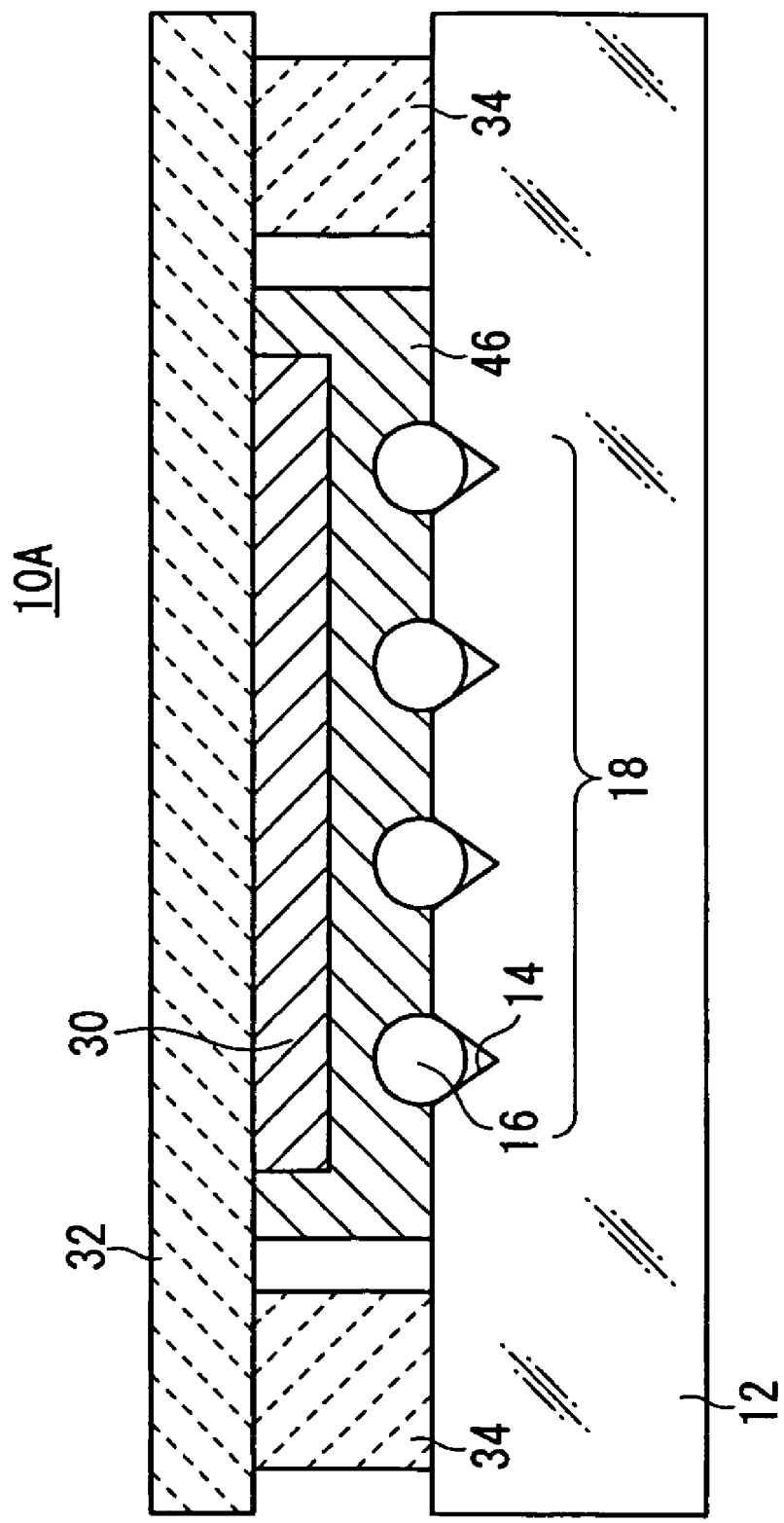
FIG. 1 is a sectional front elevational view of an optical device according to a first embodiment of the present invention.
Figure 2:
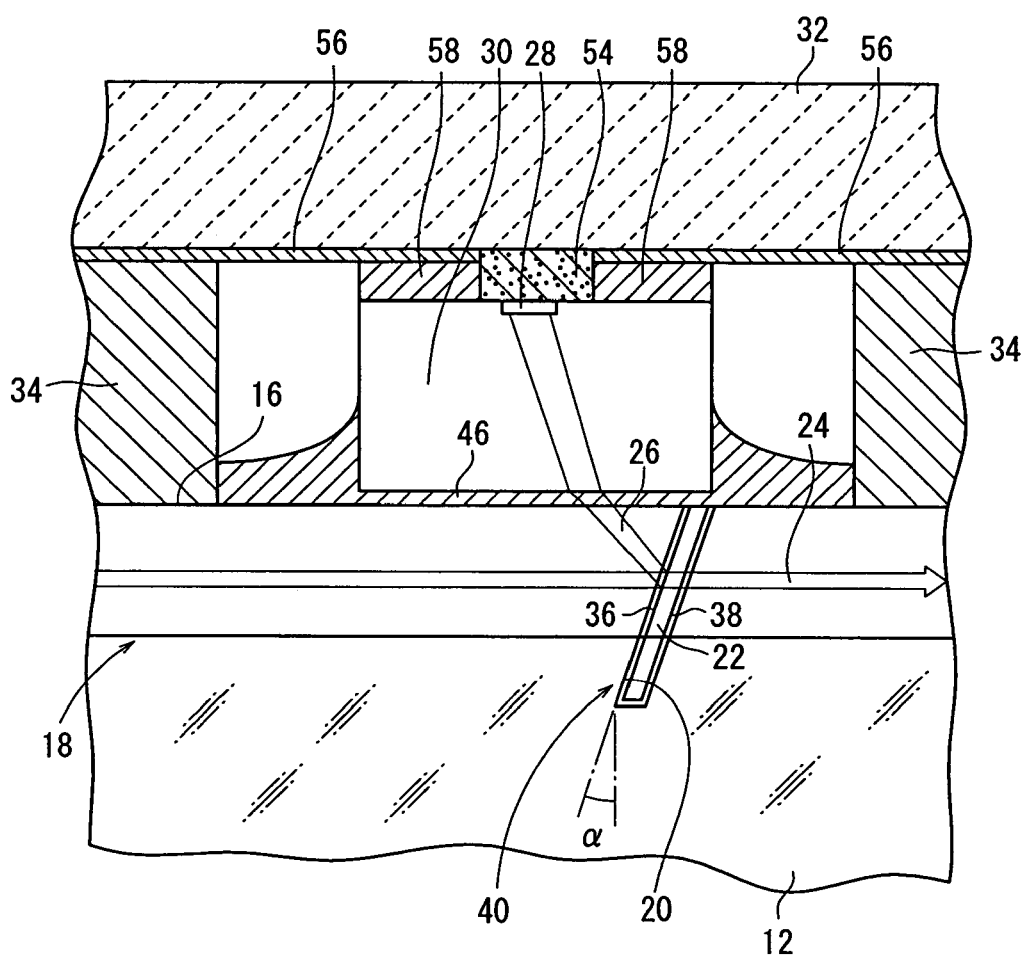
FIG. 2 is a sectional side elevational view of the optical device according to the first embodiment of the present invention.
Figure 3:
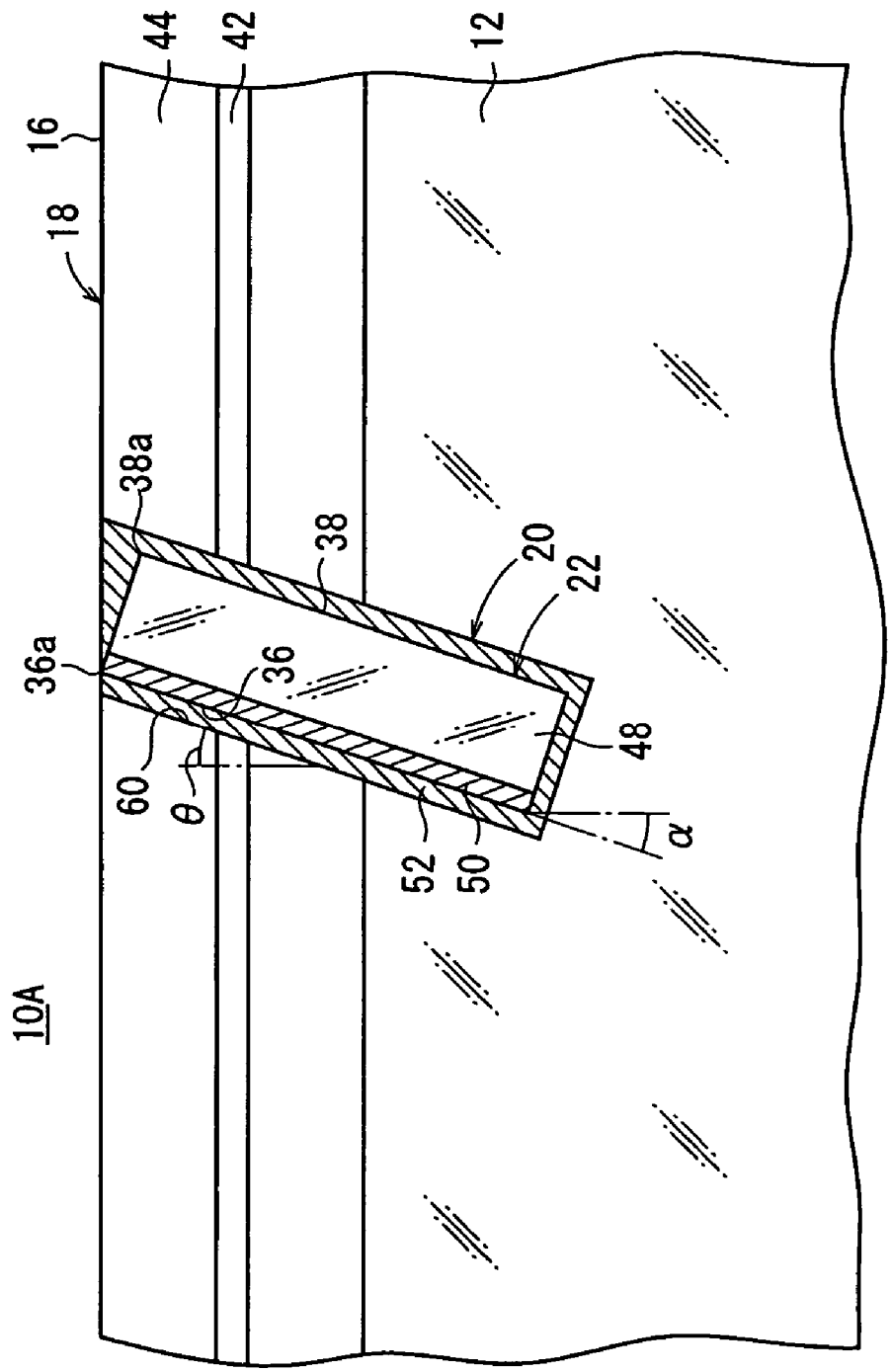
FIG. 3 is a sectional side elevational view of a portion of the optical device according to the first embodiment of the present invention.

As shown in FIGS. 1 and 2, an optical device 10A according to a first embodiment of the present invention has a glass substrate 12, an optical fiber array 18 comprising a plurality of optical fibers 16 fixed in a plurality of V-shaped grooves 14 defined in the glass substrate 12, a slit 20 (see FIG. 2) extending from the upper surfaces of the optical fibers 16 into the glass substrate 12, a dividing member (filter member) 22 (see FIG. 2) inserted in the slit 20, a PD (photodiode) array 30 having a plurality of active layers 28 for detecting light (divided light) 26 divided by at least the filter member 22, a submount 32 on which the PD array 30 is mounted and which fixes the PD array 30 so as to face toward the optical fiber array 18, and spacers 34 for stably fixing at least the PD array 30. Two end faces of the slit 20, a face surface (light-incident surface 36) of the filter member, and a reverse surface (light-exiting surface 38) of the filter member function together as a dividing unit 40 (see FIG. 2), for dividing a portion of the signal light 24 that passes through the optical fibers 16. As shown in FIG. 3, the optical fibers 16 each comprise a core 42 and a cladding 44.

Therefore, the optical device 10A according to the first embodiment of the present invention includes the glass substrate 12 with V-shaped grooves 14 defined therein, wherein the optical fiber array 18 is fixed in the V-shaped grooves 14 in the glass substrate 12, with each of the optical fibers 16 providing a light dividing function (the slit 20, the filter member 22, etc.). The PD array 30 is fixedly mounted by a refractive index matching layer 46 on the optical path of the divided light 26, which is generated by at least the light dividing function, outside of the cladding of each of the optical fibers 16. The submount 32 is provided, with the PD array 30 mounted thereon, such that the submount 32 has a mounting surface for the PD array 30, disposed in confronting relation to the glass substrate 12.

The angle of the V-shaped grooves 14 defined in the glass substrate 12 should preferably be 45° or greater in view of the load which will be applied to each of the optical fibers 16 of the optical fiber array 18 when the slit 20 subsequently is formed. The angle should also preferably be 95° or less to provide a sufficient amount of adhesive (i.e., bonding strength) in order to produce a lid-free optical fiber array. In accordance with the first embodiment, the angle is 70°.

The optical fiber array 18 is fixed to the glass substrate 12 by placing the optical fiber array 18 in the V-shaped grooves 14, applying a fixing adhesive (ultraviolet-curable adhesive), and then applying ultraviolet radiation from the reverse side of the optical fiber array 18 and from above the optical fiber array 18 to cure the adhesive.

The tilt angle a (see FIG. 2) of the slit 20, i.e., the angle with respect to the vertical plane, should preferably be in a range of from 15° to 25°. If the tilt angle a is too small, then the divided light 26 from the filter member 22 will be spread too widely, tending to impair crosstalk characteristics when the optical device is used in multichannel applications. Conversely, if the tilt angle a is too large, then the PDL (polarization dependent loss) of the divided light 26 from the filter member 22 increases, tending to result in degraded characteristics.

As shown in FIG. 3, the filter member 22 has a quartz substrate 48 and a dividing multilayer film 50 disposed on a principal surface of the quartz substrate 48. To facilitate handling of the filter member 22, the filter member 22 may be made of a plastic material, a high-polymer material, or a polyimide material. However, since the slit 20 has a large tilt angle α in the range of from 15° to 25°, the filter member 22 should preferably be made of a material having the same refractive index as the optical fibers 16 (quartz), in order to prevent the optical axis of the transmitted light from being displaced due to refraction.

The gap between the slit 20 and the filter member 22 disposed within the slit 20 is filled with an ultraviolet-curable resin (adhesive) 52. The resin 52 comprises a silicone resin, wherein the refractive index thereof is substantially the same as the refractive index of the cores 42 of the optical fibers 16 and the refractive index of the quartz substrate 48 of the filter member 22.

As shown in FIG. 2, the PD array 30 is of a structure for detecting light applied to its reverse side. An anisotropic conductive paste 54, rather than gold solder or electrode or silver paste, is disposed upwardly of the active layers 28 (up to the submount 32). In order to provide favorable crosstalk characteristics, the region above the active layers 28 should preferably be formed of a material having low reflectance, such as an anisotropic conductive paste 54, air, or the like, rather than a material having high reflectance such as gold or the like. Of course, the PD array 30 may be a PD array for detecting light applied to its face side.

The submount 32 is mounted within a structure, which includes the optical fiber array 18, the PD array 30, and the submount 32, arranged successively. The submount 32 is made of $Al_2O_3$.

The PD array 30 for detecting light applied to its reverse side has anode electrodes and cathode electrodes, which are disposed on the surface of the active layers 28 (facing the submount 32), and a common cathode electrode and anode electrodes associated with respective channels are patterned as a gold electrode pattern 56 on the submount 32. Bumps 58 of gold are disposed in regions corresponding to the anode electrodes of the respective channels and the cathode electrodes, wherein the region above the active layers 28 is filled with the anisotropic conductive paste 54. The bumps 58 of gold serve the purpose of achieving reliable conduction, and also the purpose of increasing the inter-electrode distance between the active layer 28 and the submount 32, in order to reduce stray light due to reflection and scattering within such areas. When heat is applied to the anisotropic conductive paste 54, a conductive material such as silver or the like in the anisotropic conductive paste 54 is attracted to the conductive areas, such as the bumps 58 of gold, thereby providing conductivity only between the anisotropic conductive paste 54 and the gold electrode pattern 56.

The area of the lower surface of the submount 32, which corresponds to the active layers 28, is coated with SiN (not shown) for reducing reflection due to the refractive index difference.

Spacers 34, for providing a predetermined gap between the optical fiber array 18 and the PD array 30, are fixed to the mounting surface of the submount 32 by an ultraviolet-curable adhesive, for example.

In the optical device 10A according to the first embodiment, as shown in FIG. 3, of the light-incident surface 36 and the light-exiting surface 38 of the filter member 22, at least the light-exiting surface 38 has an upper end 38a positioned below upper surfaces of the optical fibers 16 (upper surfaces of the claddings 44, also applicable to the description below).

According to the first embodiment, the light-incident surface 36 of the filter member 22 has an upper end 36a positioned in substantial alignment with the upper surfaces of the optical fibers 16, and the upper end 38a of the light-exiting surface 38 of the filter member 22 is positioned below the upper surfaces of the optical fibers 16.

In the optical device 10A according to the first embodiment, the upper portion of the filter member 22 (the upper portion including the upper end 36a of the light-incident surface 36 and the upper end 38a of the light-exiting surface 38 of the filter member 22, also applicable to the description below) does not project from the upper surfaces of the optical fibers 16. Consequently, even when a resin 52 filled in the gap between the slit 20 and the filter member 22 imposes large stresses on the filter member 22, the filter member 22 is prevented from being broken.

According to the first embodiment, the slit 20 is defined obliquely to the optical fiber array 18, and the angle θ between an inner wall surface 60 of the slit 20 which faces the light-incident surface 36 of the filter member 22 and a plane perpendicular to the optical axes of the cores 42 is 5° or greater. However, since the upper end 38a of the light-exiting surface 38 of the filter member 22 is embedded in the slit 20, concentration of stress does not occur on the filter member 22.

As the filter member 22 in its entirety is embedded in the slit 20, the resin 52 in the slit 20 does not creep onto the upper surface of the optical fiber array 18. Therefore, even if the material of the resin 52 in the slit 20 and the material of the refractive index matching layer 46 (see FIG. 2) filled between the optical fiber array 18 and the PD array 30 are different from each other, since the resin 52 in the slit 20 does not creep onto the upper surface of the optical fiber array 18, there is no increase in the number of refractive index interfaces, the PDL is prevented from increasing, and the light detecting characteristics are prevented from becoming degraded by the resin 52. This leads to a wider choice of materials available for the refractive index matching layer 46, which is filled between the optical fiber array 18 and the PD array 30, as well as for the resin 52 filled in the slit 20.

Inasmuch as the upper portion of the filter member 22 does not project from the upper surface of the optical fiber array 18, the filter member 22 does not present an obstacle to proper mounting of the PD array 30 when the PD array 30 is mounted on the optical fiber array 18.

Figure 4:
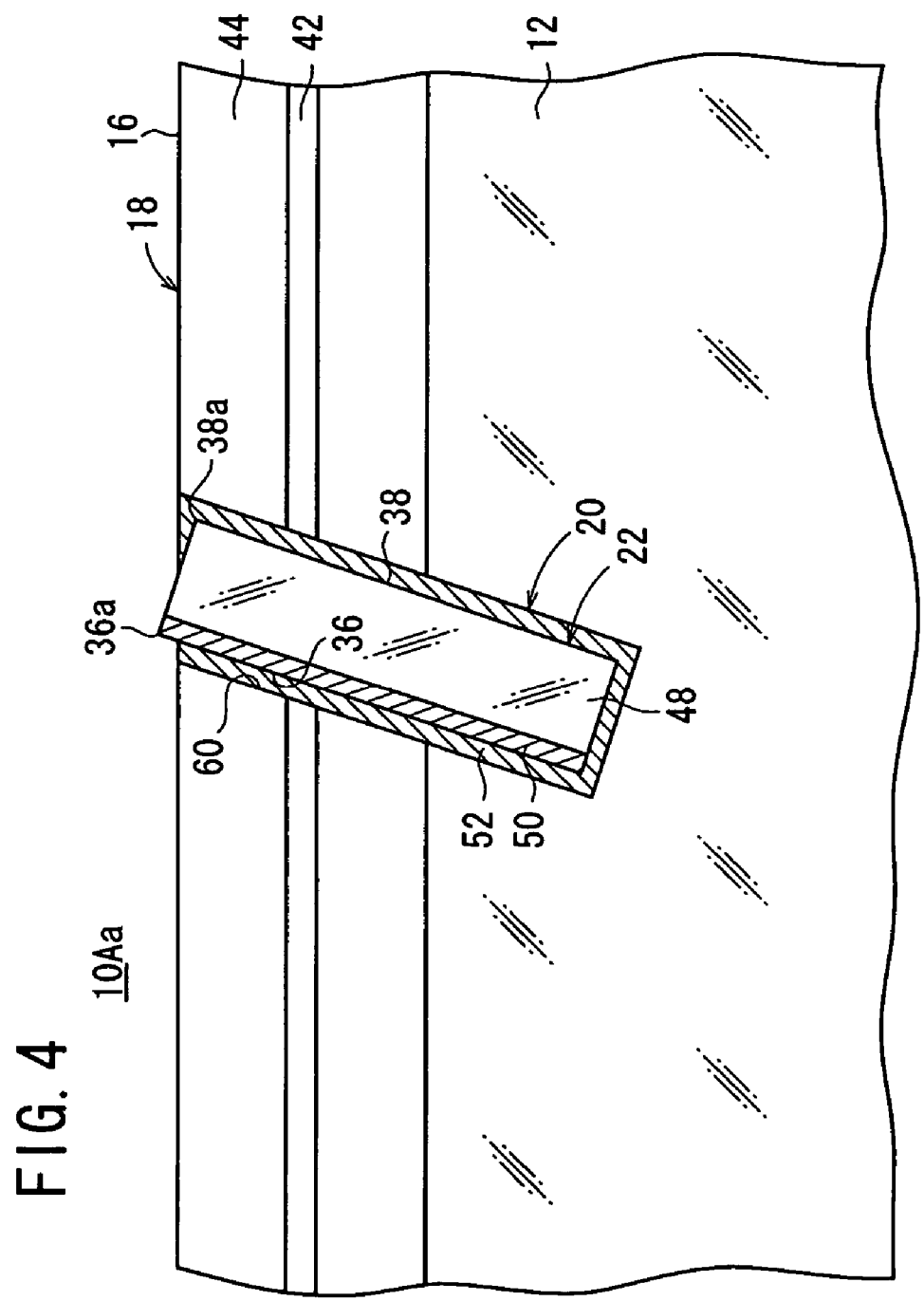
FIG. 4 is a sectional side elevational view of a portion of a modification of the optical device, according to the first embodiment of the present invention.

With the optical device 10A according to the first embodiment, the upper end 36a of the light-incident surface 36 of the filter member 22 is positioned in substantial alignment with upper surfaces of the optical fibers 16, and the upper end 38a of the light-exiting surface 38 of the filter member 22 is positioned below the upper surfaces of the optical fibers 16. However, with an optical device 10Aa according to a modification of the embodiment, as shown in FIG. 4, the upper end 36a of the light-incident surface 36 of the filter member 22 is positioned above the upper surfaces of the optical fibers 16, and the upper end 38a of the light-exiting surface 38 of the filter member 22 is positioned below the upper surfaces of the optical fibers 16.

According to this modification, the resin 52 in the slit 20 tends to creep onto the upper surface of the optical fiber array 18. However, the degree at which the resin 52 creeps is too small to affect the effective refractive index of the optical fiber array 18. When the PD array 30 is mounted on the optical fiber array 18, the filter member 22 does not present an obstacle to proper mounting of the PD array 30.

An optical device 10B according to a second embodiment of the present invention shall be described below with reference to FIG. 5.

Figure 5:
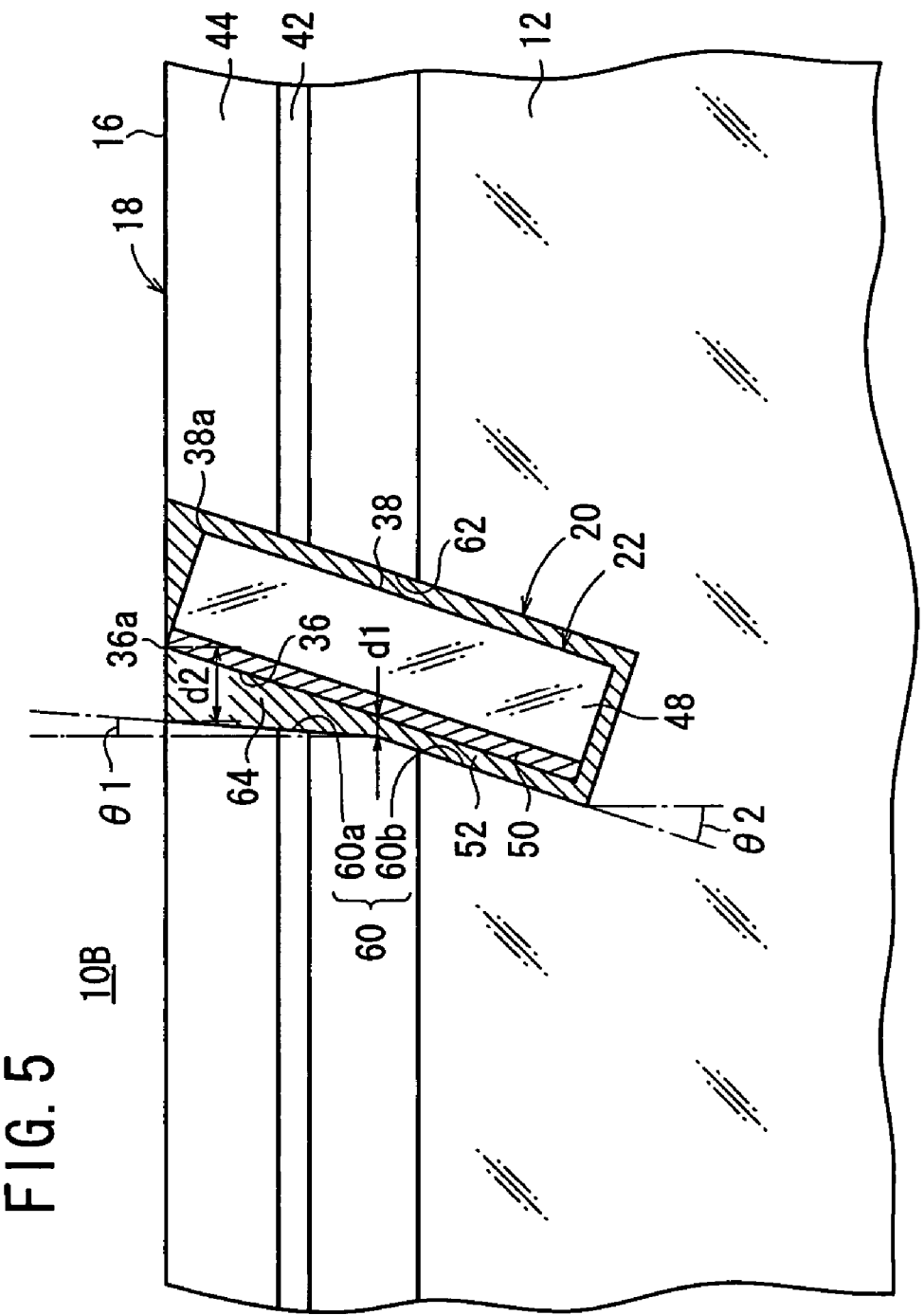
FIG. 5 is a sectional side elevational view of a portion of an optical device according to a second embodiment of the present invention.
Figure 6:
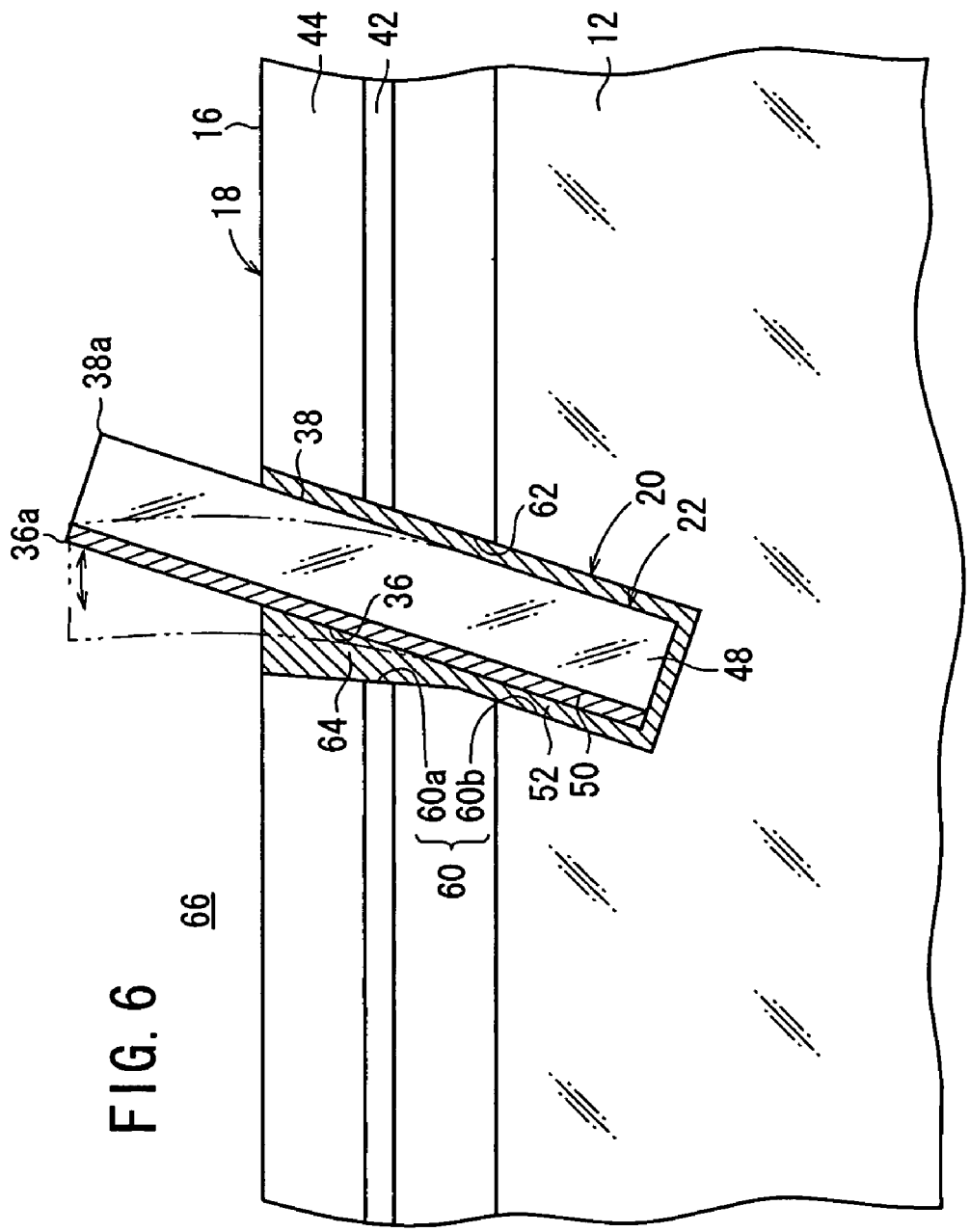
FIG. 6 is a sectional side elevational view of a portion of an optical device according to a comparative example.

As shown in FIG. 5, the optical device 10B according to the second embodiment is of substantially the same structure as the optical device 10A according to the first embodiment described above, except as follows:

Of the inner wall surfaces 60, 62 of the slit 20, the inner wall surface 60 that faces the light-incident surface 36 of the filter member 22 has a first surface 60a covering the cores 42, and a second surface 60b extending down to the bottom of the slit 20. If the shortest distance from the boundary between the first surface 60a and the second surface 60b to the filter member 22 is indicated by d1, and the shortest distance from the upper end 36a of the light-incident surface 36 of the filter member 22 to the first surface 60a of the slit 20 is indicated by d2, then these shortest distances d1 and d2 are related to each other such that d1<d2.

The above arrangement is effective to reduce interference between the light divided by the inner wall surface 60 of the slit 20 and the light 26 divided by the light-incident surface 36 of the filter member 22. As a result, the capability for monitoring signal light 24 is increased, along with improving reliability.

With this arrangement, however, a large space (a resin reservoir 64) is created between the filter member 22 and the slit 20, wherein the cores 42 are exposed in the space 64. Therefore, if the upper portion of the filter 22 projects from the upper surface of the optical fiber array 18, in the same manner as the optical device 66 according to the comparative example shown in FIG. 6, then if the filter member 22 becomes broken due to external forces or concentration of stress exerted during expansion and contraction of the resin 52 within the slit 20, broken pieces drop into and accumulate within the resin reservoir 64, which tends to seriously degrade the propagation characteristics of the signal light 24 that passes through the cores 42. Furthermore, if the filter member 22 is made of a soft material, such as polyimide or the like, and the upper portion of the filter member 22 projects outward, then as indicated by the two-dot-and-dash lines in FIG. 6, the angle at which the filter member 22 is inserted changes upon expansion and contraction of the resin 52, which also tends to degrade the characteristics with which the signal light 24 is monitored.

In the optical device 10B according to the second embodiment shown in FIG. 5, however, since the upper end 36a of the light-incident surface 36 of the filter member 22 is positioned substantially in alignment with the upper surface of the optical fiber array 18, and the upper end 38a of the light-exiting surface 38 of the filter member 22 is positioned below the upper surface of the optical fiber array 18, the filter member 22 is essentially free of such external forces, and is not subject to breakage.

Even if the filter member 22 is made of a soft material, the angle at which the filter member 22 is inserted does not change upon expansion and contraction of the resin 52, and hence the characteristics for monitoring the signal light 24 are not degraded upon expansion and contraction of the resin 52.

Thus, the optical device 10B according to the second embodiment employs a structure that is effective to reduce interference of the divided light 26, thereby increasing its ability to monitor the signal light 24, while also improving the reliability of the optical device.

In the optical device 10B according to the second embodiment, as shown in FIG. 5, the difference (θ1−θ2) between the angle θ1 formed between the first surface 60a and a plane perpendicular to the optical axes of the cores and the angle θ2 formed between the second surface 60b and the plane perpendicular to the optical axes of the cores should preferably be 0.5° or greater. If the difference is smaller than 0.5°, then the light 26 that is divided by the filter member 22 interferes with reflected light produced due to the refractive index difference between the resin 52 on the inner wall surface 60 (the first surface 60a) of the slit 20 and the cores 42 of the optical fibers 16, tending to degrade the functions necessary for properly monitoring the signal light 24.

Figure 7:
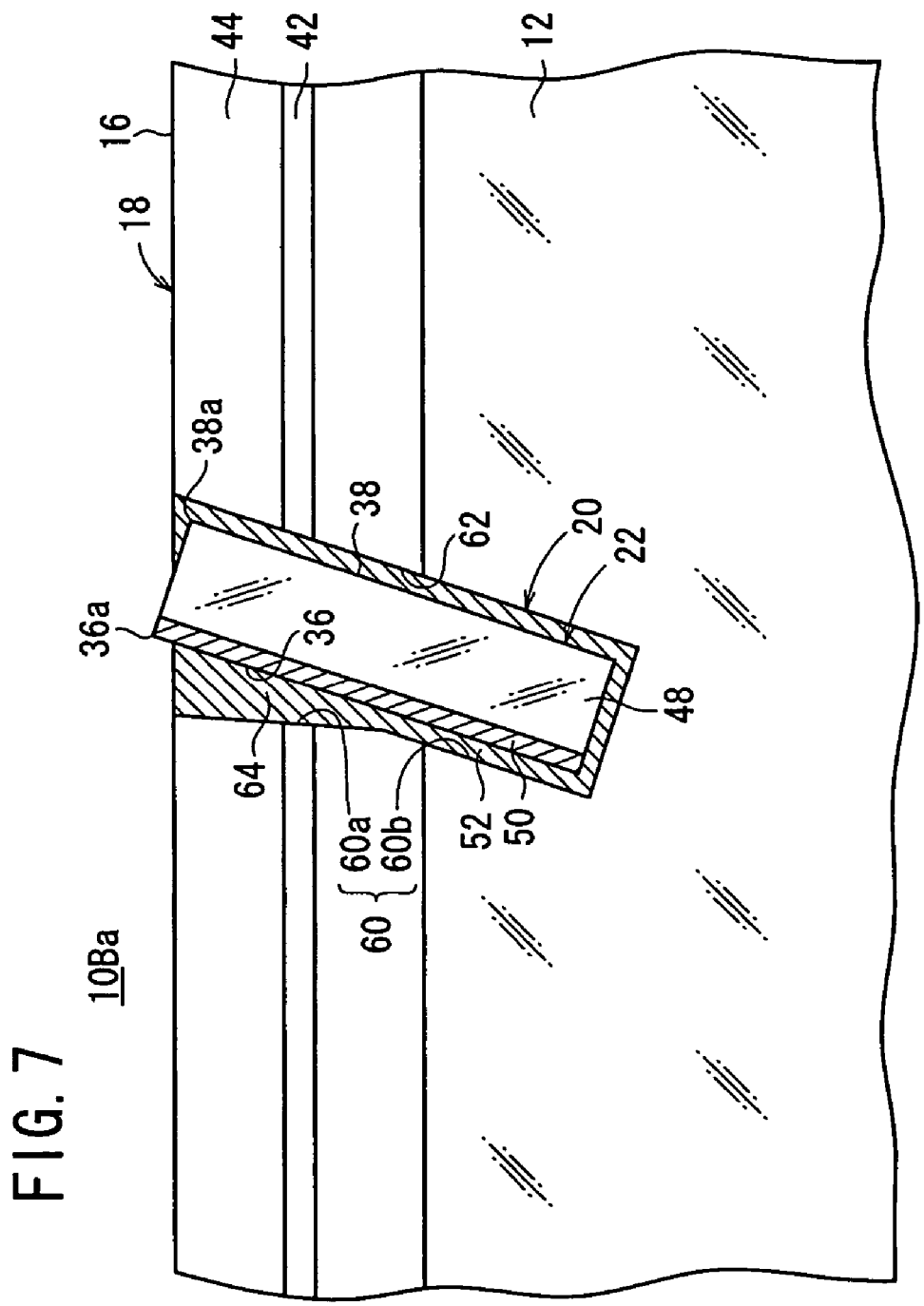
FIG. 7 is a sectional side elevational view of a portion of a first modification of the optical device, according to the second embodiment of the present invention.

FIG. 7 shows an optical device 10Ba according to a first modification. In the optical device 10Ba, the upper end 36a of the light-incident surface 36 of the filter member 22 is positioned above the upper surfaces of the optical fibers 16, and the upper end 38a of the light-exiting surface 38 of the filter member 22 is positioned below the upper surfaces of the optical fibers 16.

Figure 8:
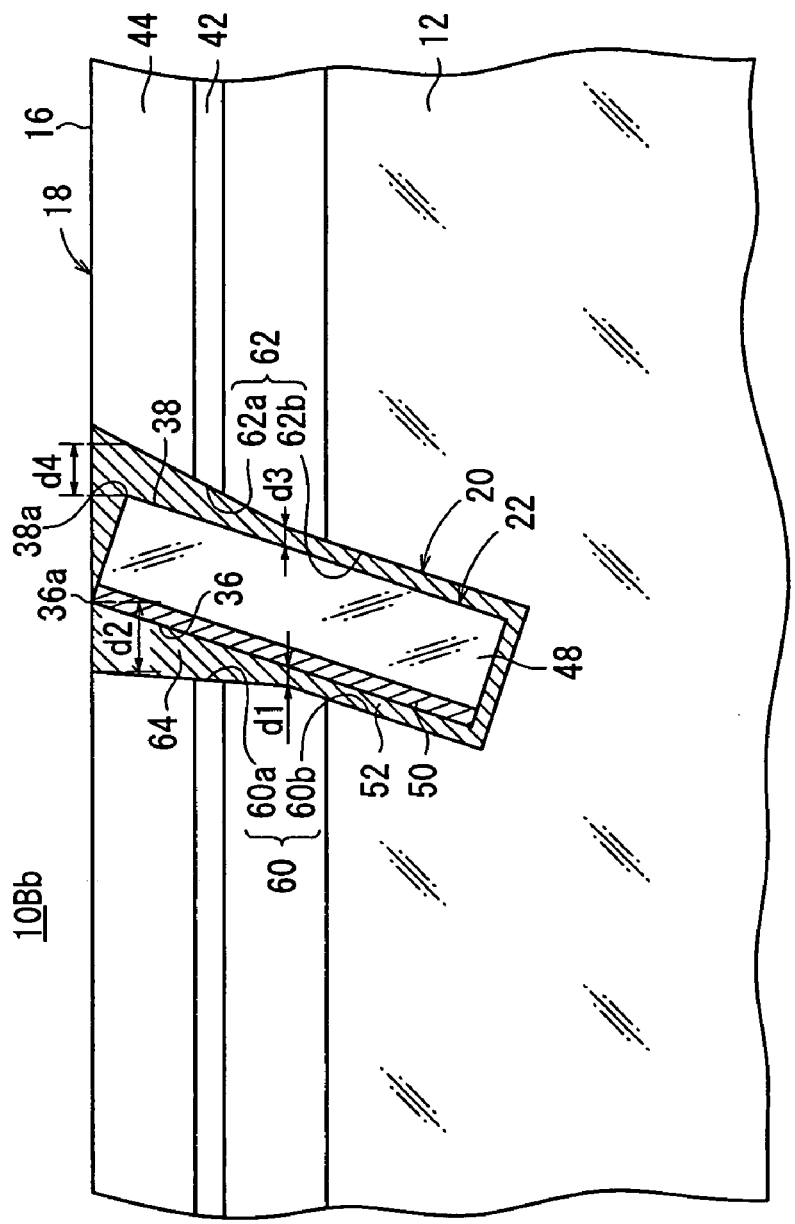
FIG. 8 is a sectional side elevational view of a portion of a second modification of the optical device, according to the second embodiment of the present invention.
Figure 9:
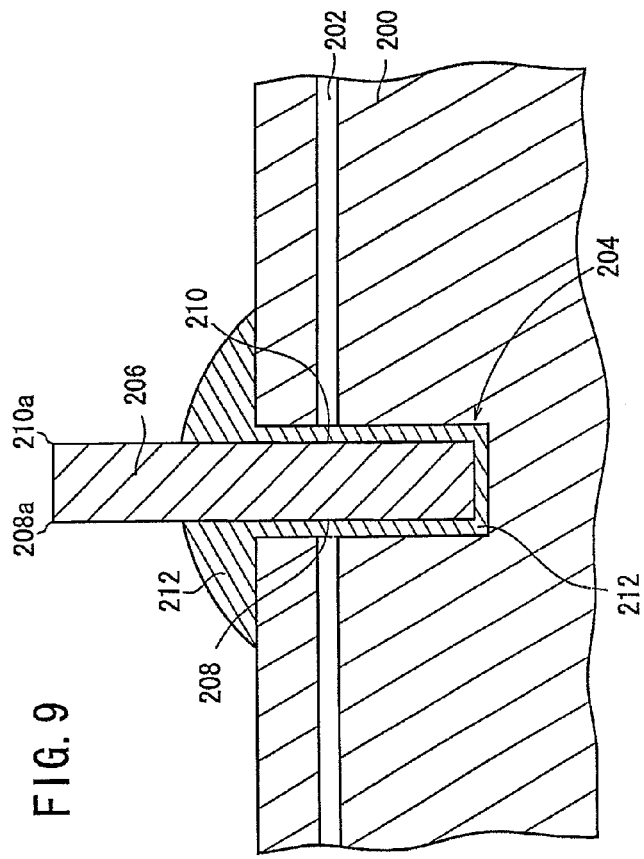
FIG. 9 is a sectional side elevational view of a portion of a conventional optical device.
Figure 10:
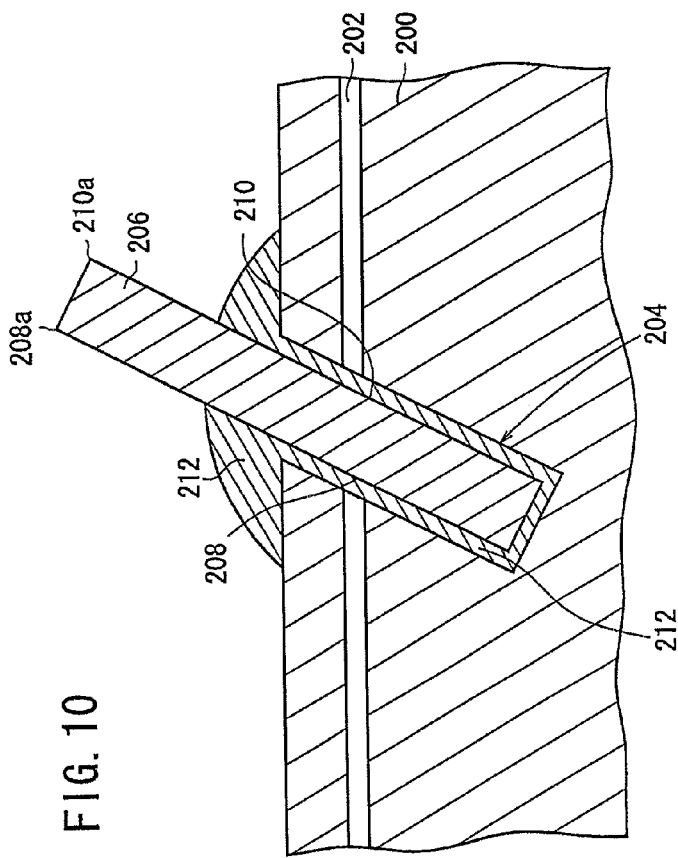
FIG. 10 is a sectional side elevational view of a portion of another conventional optical device.

FIG. 8 shows an optical device 10Bb according to a second modification. In the optical device 10Bb, of the inner wall surfaces 60, 62 of the slit 20, the inner wall surface 60 that faces the light-incident surface 36 of the filter member 22 has a first surface 60a and a second surface 60b. In addition, the inner wall surface 62 that faces the light-exiting surface 38 of the filter member 22 in the slit 20 has a third surface 62a covering the cores 42 and a fourth surface 62b extending down to the bottom of the slit 20. If the shortest distance from the boundary between the third surface 62a and the fourth surface 62b to the filter member 22 is indicated by d3, and the shortest distance from the upper end 38a of the light-exiting surface 38 of the filter member 22 to the third surface 62a of the slit 20 is indicated by d4, then these shortest distances are related to each other by d3<d4.

The optical devices 10A, 10B according to the first and second embodiments are applied to an optical fiber array 18 having plural optical fibers 16. However, the optical device according to the present invention is also applicable to an optical waveguide array having a plurality of optical waveguides arrayed on an LN substrate, for example.

An example, in which the optical device 10B according to the second embodiment was applied to a 10-channel monitoring module, shall be described below.

First, the glass substrate 12 for use in the optical device according to the example was fabricated by polishing. The glass substrate 12 was fabricated using a borosilicate glass, e.g., Pyrex (registered trademark) glass. Twelve V-shaped grooves 14, having an angle of 70° respectively, were formed in the glass substrate 12.

Then, the optical fiber array 18 was assembled. The optical fiber array 18 was of an inline design. According to this design, a peeled optical fiber array 18 is mounted on the glass substrate 12, which does not have the end faces thereof polished. There are no members provided, such as a holder substrate, above the optical fiber array 18, so that various functional members can be placed on the optical fiber array 18, while leaving the upper surface of the optical fiber array 18 directly exposed.

The optical fiber array 18 comprised a 12-core ribbon fiber assembly, having a pitch of 250 μm, so that the optical fiber array 18 could be placed within the V-shaped grooves 14 in the glass substrate 12. The tape was peeled off from the 12-core ribbon fiber assembly in order to provide a peeled region having a length of 12 mm, and the optical fibers were placed within the V-shaped grooves 14 in the glass substrate 12. The tape can be peeled off by being chemically dissolved, or the tape can be removed mechanically. In the example, the tape was mechanically removed, taking into account the need for environmental protection and safe working conditions.

Thereafter, the fiber assembly was fixed within the V-shaped grooves 14 in the glass substrate 12. First, with the fiber assembly placed within the V-shaped grooves 14 in the glass substrate 12, a holder substrate was placed on the fiber assembly, thereby holding the fiber assembly. The holder substrate had a coating that does not react with the fixing adhesive. Then, the fixing adhesive was poured in and cured, after which the holding substrate was removed, thereby completing the optical fiber array 18.

Thereafter, the slit 20 was formed in and across the optical fiber array 18. The slit 20 had a final shape, similar to the slit 20 of the optical device 10B according to the second embodiment shown in FIG. 5. More specifically, of the inner wall surfaces 60, 62 of the slit 20, the inner wall surface 60 facing the light-incident surface 36 of the filter member 22 had a first surface 60a covering the cores 42 and a second surface 60b extending down to the bottom of the slit 20.

Initially, a first slit was formed in and across the optical fiber array 18. The first slit had a thickness of 30 μm, a depth of 200 μm, and an angle of 20° with respect to the plane perpendicular to the optical axis of the optical fiber array 18. The first slit was formed using an electroformed grinding stone #2000. Then, a second slit was formed at a desired angle. At this stage, a slit 20 was fabricated, having the same shape as the slit 20 in the optical device 10B according to the second embodiment. According to this example, the first slit had an angle of 20° and the second slit had an angle of 16°. The difference between these angles should preferably be set to 0.5° or greater. If the angle difference is smaller than 0.5°, then the light 26 divided by the filter member 22 interferes with reflected light produced due to the refractive index difference between the resin 52 on the inner wall surface 60 (first surface 60a) of the slit 20 and the cores 42 of the optical fibers 16, which tends to degrade the light detecting characteristics of the PD array 30.

Then, the filter member 22 was fabricated. The substrate of the filter member 22 was made of quartz glass having a size of 50 mm×50 mm×1 mm (thickness). Thin films of $SiO_2$, $Al_2O_3$, and $TiO_2$ were evaporated onto the substrate, forming a multilayer film 50 having desired characteristics. A member having a size of 190 μm×7 mm was cut out of the substrate, and ground to a thickness of 25 μm, thereby producing the filter member 22.

The fabricated filter member 22 was inserted into the slit 20 in the optical fiber array 18. The filter member 22 was precisely inserted into the slit 20 using a dedicated stage system. More specifically, there are two processes available for inserting the filter member 22 into the slit 20. According to the first process, the filter member 22 is inserted into the slit 20, and then the resin 52 is poured into the slit 20. According to the other process, the tip end of the filter member 22 is coated with a small amount of resin 52, and then the filter member 22 is inserted into the slit 20. In the present example, the first process was employed. Furthermore, the filter member 22 was gradually inserted sideways into the slit 20. This is because if the filter member 22 is inserted into the slit 20 from above, it may be difficult to insert the filter member 22 due to warpage thereof. Fine adjustments were made on the stage system so that the upper portion of the filter member 22 did not project from the upper end of the slit 20 in the optical fiber array 18. Finally, the resin 52 filled in the slit 20 was cured.

Thereafter, the PD array 30 was mounted on the optical fiber array 18, and aligned centrally thereon. The PD array 30 had 10 channels, and its optimum position was determined while searching for a peak, based on monitoring output signals from the channels on the opposite ends. A refractive index matching layer 46 was filled between the surface of the PD array 30 and the optical fiber array 18. At this stage, the optical device according to the example was completed. Since a 10-channel monitor module was fabricated from the 12-core optical fiber array 18, two channels were not used. The optical fibers of the unused two channels were terminated, and corresponding electrode pads on the submount 32 were grounded.

Then, the optical device was fixed to a package, wherein the pins of the package and the electrode pads of the submount 32 were electrically connected by bonding wires, whereupon the assembly was completed to produce a final product. If the package is of a DIP (Dual In-line Package) type, then bonding wire connections are required. If the optical device is packaged according to SMT (Surface-Mount Technology), then since bonding wires are not required, the cost can be reduced and reliability can be improved.

Then, the product was evaluated for performance characteristics. The evaluation mainly included an evaluation of characteristics of the signal light 24 emitted through the dividing unit 40, together with evaluation of an output signal of the PD array 30 that has detected the divided light 26. The signal light 24 was measured for insertion loss [dB] and PDL [dB], and the output signal of the PD array 30 was measured for light detecting efficiency [mA/W], PDL [dB], and crosstalk [dB].

According to the evaluation, the insertion loss was smaller than 1 dB, the PDL of the signal light 24 was smaller than 0.05 dB, the output efficiency of the PD array 30 was in a range of from 50 to 100 mA/W, the PDL of the output efficiency of the PD array 30 was smaller than 0.3 dB, and crosstalk was smaller than −35 dB. Thus, it was confirmed that desired characteristics were satisfied.

Finally, a reliability evaluation was conducted. Test items were prepared in accordance with Telcordia GR-468-CORE specifications. As a result of this evaluation, it was confirmed that all items pertaining to Telcordia GR-468-CORE were satisfied.

The optical device according to the present invention is not limited to the above embodiments, but various other structural details may be adopted or modified without departing from the scope of the present invention.

INDUSTRIAL APPLICABILITY

As described above, the optical device according to the present invention is effective to prevent a dividing member from becoming broken, while also preventing resin from creeping onto a light transmitting means, and preventing the effective refractive index of the light transmitting means from changing unnecessarily. When an optical unit is mounted on the light transmitting means, the dividing member of the optical device does not present an obstacle to mounting of the optical unit, whereby the optical device is capable of improving reliability and also increasing the capability for monitoring signal light.

What is claimed is:

1. An optical device comprising:
   light transmitting means;
   a slit extending from an upper portion of said light transmitting means to at least a core of said light transmitting means;
   a dividing member inserted in said slit for dividing a portion of signal light propagated through said core; and
   a resin filled in a gap between said slit and said dividing member in said slit,
   wherein of a light-incident surface and a light-exiting surface of said dividing member, at least said light-exiting surface has an upper end positioned below the upper portion of said light transmitting means.

2. An optical device according to claim 1, wherein an inner wall surface of said slit facing the light-incident surface of said dividing member has an angle of 5° or greater with respect to a plane perpendicular to the optical axis of said core.

3. An optical device according to claim 1, wherein an optical unit is disposed on the upper portion of said light transmitting means, for detecting light divided by said dividing member.

4. An optical device according to claim 1, wherein an inner wall surface of said slit facing the light-incident surface of said dividing member has a first surface covering said core and a second surface extending to a bottom of said slit, and if the shortest distance from the boundary between said first surface and said second surface to said dividing member is indicated by d1, and the shortest distance from the upper end of said light-incident surface of said dividing member to said first surface of said slit is indicated by d2, then the shortest distances are related to each other by d1<d2.

5. An optical device according to claim 4, wherein the difference between an angle formed between said first surface and a plane perpendicular to the optical axis of said core and an angle formed between said second surface and the plane perpendicular to the optical axis of said core is 0.5° or greater.

* * * * *

UNITED STATES PATENT AND TRADEMARK OFFICE
CERTIFICATE OF CORRECTION

PATENT NO. : 7,324,729 B2  Page 1 of 1
APPLICATION NO. : 11/288936
DATED : January 29, 2008
INVENTOR(S) : Masashi Fukuyama, Yasunori Iwasaki and Akiyoshi Ide It is certified that error appears in the above-identified patent and that said Letters Patent is hereby corrected as shown below:

On the title page:

Item (56) References Cited- *Foreign Patent Documents*:

please change "JP 2001-513216 8/2004" to --JP 2001-513216 8/2001-- and add --JP 2001-102684 A 4/2001--

Signed and Sealed this

Ninth Day of June, 2009

JOHN DOLL
*Acting Director of the United States Patent and Trademark Office*